June 7, 1960     J. S. WREFORD     2,939,902
WELDING CABLE
Filed May 7, 1958     2 Sheets-Sheet 1
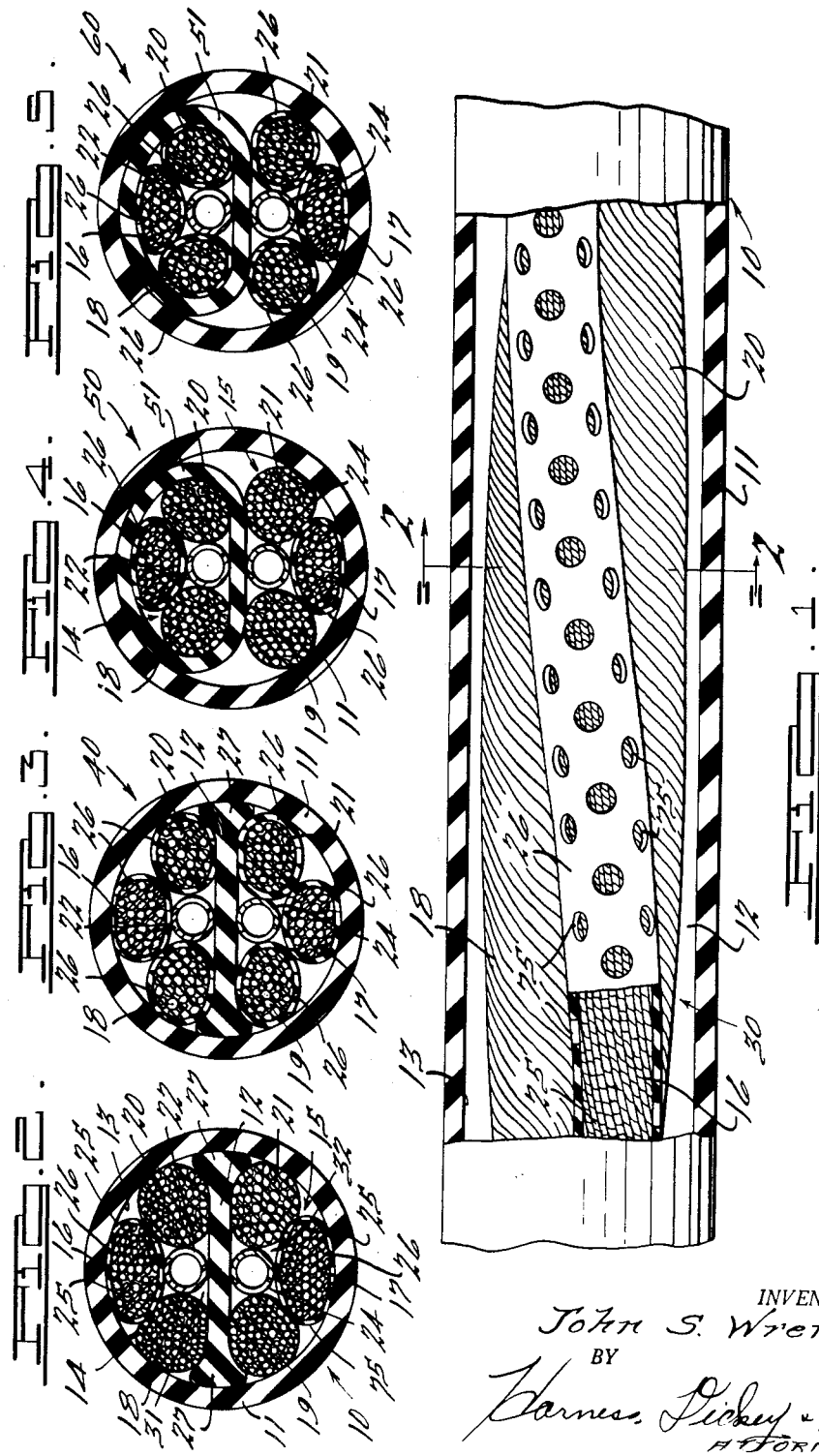
INVENTOR.
John S. Wreford,
BY
Harness, Dickey & Pierce
ATTORNEYS.

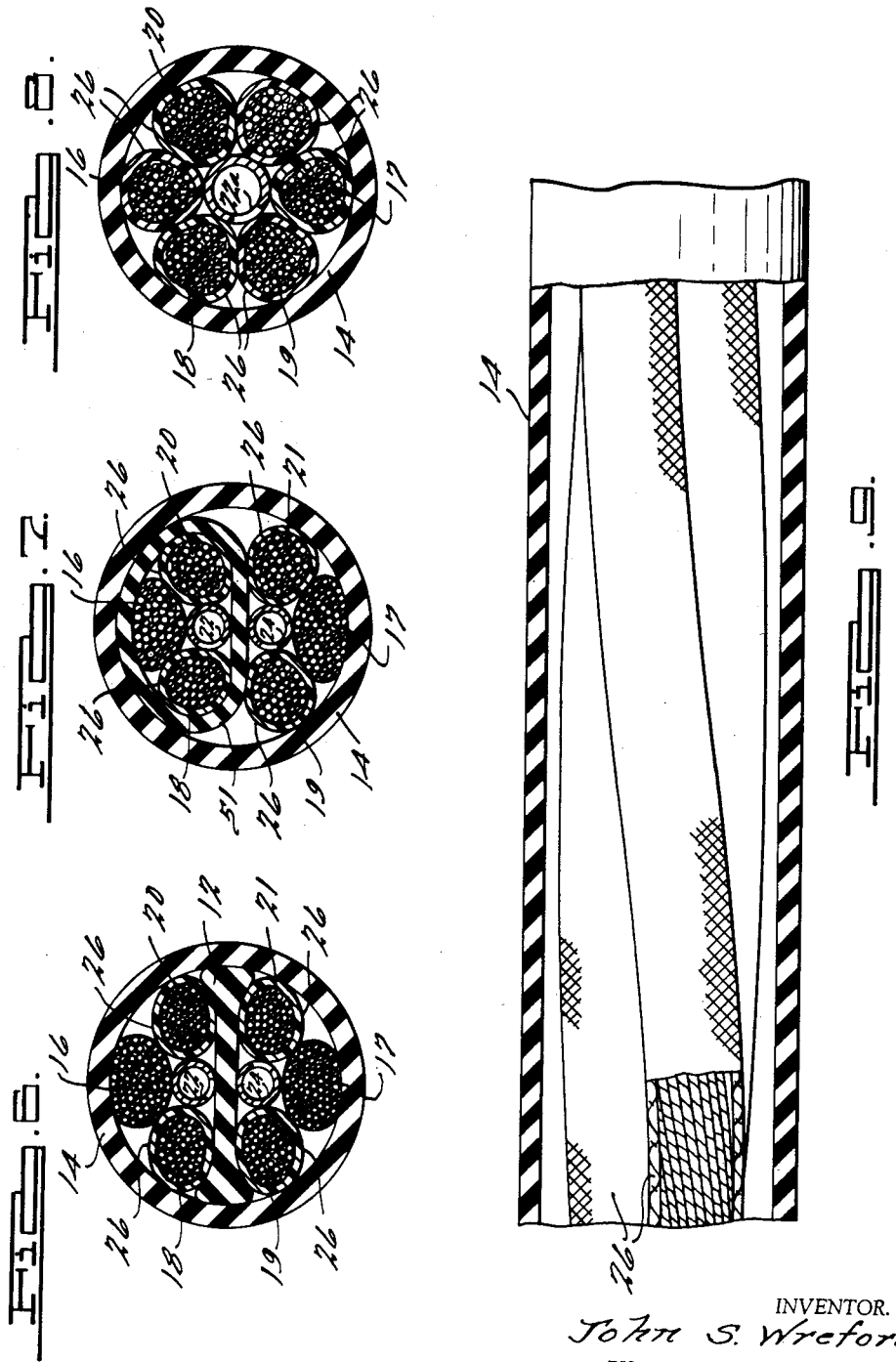

United States Patent Office 2,939,902
Patented June 7, 1960

2,939,902

WELDING CABLE

John S. Wreford, Franklin, Mich., assignor to Gar Wood Industries, Inc., Wayne, Mich., a corporation of Michigan Filed May 7, 1958, Ser. No. 733,549

12 Claims. (Cl. 174—15)

This invention relates to welding and, in particular, to welding cables, and the present application is a continuation-in-part of my previously filed copending application Serial No. 319,853, filed November 12, 1952, now abandoned.

One object of this invention is to provide a welding cable wherein the subconductors, of which each of the two conductors of the cable is composed, are protected from fraying and excessive breakage of strands arising from rubbing lengthwise between the subconductors as the conductors flex during use, either by reason of electromagnetic action resulting from the passage of welding current, or from mechanical flexion resulting from bending the cable during work.

Another object is to provide a welding cable of the foregoing character wherein one or more of the subconductors is sheathed in an abrasion-resistant friction-reducing sheath, sleeve or jacket of any suitable material having low frictional characteristics such as nylon or other synthetic plastic or rubber at least in the vicinity of the cable heads, where such fraying and strand breakage ordinarily becomes excessive.

Another object is to provide a welding cable of the foregoing character wherein a sheath, sleeve or jacket of rubber or other durable abrasion-resistant friction-reducing material is provided over one or more of the subconductors preferably for its entire length, this sleeve being perforated or of a loose mesh weave so as to permit the free passage of cooling water into and out of the subconductor while preventing direct sliding contact between the adjacent subconductors and consequently greatly reducing the fraying or breakage of wire strands previously resulting from such direct contact.

Other objects and advantages of the invention will become apparent during the course of the following description of the accompanying drawings, wherein:

Figure 1 is a longitudinal sectional elevational view of the welding cable of this invention with some parts broken away and other parts shown in section for the purpose of clarity;

Fig. 2 is a sectional view taken along the line 2—2 of Fig. 1;

Fig. 3 is a cross section similar to Fig. 2, but showing a modification in which all three subconductors of each main conductor are sheathed;

Fig. 4 is a cross section through a welding cable employing the central sheathing of Fig. 2, but using a tubular separator between the main conductors of the welding cable;

Fig. 5 is a cross section similar to Fig. 4, through a welding cable employing sheathing on all three subconductors as in Fig. 3 but using a tubular separator between the main conductors of the welding cable;

Figs. 6, 7 and 8 are cross sections similar to Figs. 2 to 5 inclusive but showing further modifications; and Fig. 9 is a view similar to Fig. 1 showing another modification.

Welding cables, which are widely used in industry to connect and carry current from welding transformers to so-called welding guns employed to make spot welds on work which is too large to be carried to a welding machine, are ordinarily constructed of fine strands of copper wire twisted into small units which in turn are laid up into subconductors and several of these subconductors placed together within a tubular rubber hose in two groups or main conductors separated from one another by a rubber separator running substantially the entire length of the cable. Water is caused to flow through the hose on both sides of the separator in order to cool the conductors so as to take away the high heat generated by the passage of the welding current during welding operations. The cooling water, however, if reasonably free from contamination by salts or other minerals, does not short-circuit the conductors of the welding cable, as at first glance might be thought, even though the separator may not be tight and the water flowing to and from the spaces on opposite sides of the separator may also be mingled, because the welding current is of a very low voltage but very high amperage in comparison with the ordinary 110 volt house lighting current. Welding current is almost always less than 20 volts in potential, two to six volts being common at the point of weld, yet the amperage usually rises above 10,000 amperes and sometimes up to 50,000 amperes, in contrast to the low amperage of house lighting current, as indicated by the 15 ampere and 30 ampere fuses most usually used to protect such circuits.

Hitherto, when welding cables of the foregoing character have been used on locations such as automobile or railway vehicle assembly lines, the constant moving of the welding gun from one part to another of the body being fabricated by spot welding causes the conductors of the welding cable to be flexed as the cable is bent, while the subconductors of each main conductor move lengthwise relatively to one another in sliding contact with one another. This rubbing between the subconductors causes wear and breakage of the tiny strands of copper wire of which these subconductors are made up, and the tiny splinters resulting from such strand breakages make their way into the cooling passages for the flow of cooling water through the cable heads, clogging the passages and causing the cable to overheat and burn up as a result of the cutting off of the flow of the indispensable cooling water.

Moreover, the subconductors also flex longitudinally relatively to one another as a result of electromagnetic action occurring whenever the welding circuit is closed at the welding gun in making a weld. When this is done, the subconductors tend to pull themselves together as a result of the magnetic field created around them when the current flows through the welding cable in making a weld. When the weld is completed and the current is turned off, the magnetic field disappears and the subconductors relax. As a consequence, every time the weld is made, the subconductors slide lengthwise relatively to one another and the friction and abrasion between them contribute greatly to the strand breakage and splintering.

The present invention greatly reduces such strand breakage and consequent clogging of the cooling water passages by encasing one or more of the subconductors of each main conductor in a sheath or jacket of abrasion-resistant material such as plastic or rubber which is perforated so as to enable the cooling water to pass freely inwardly and outwardly therethrough. When a rubber material is utilized, a rubber having a hard glossy characteristic is used so that there is very little friction developed between a rubber sleeve and an adjacent rubber sleeve or metal subconductor. The presence of the cooling fluid, of course, further reduces the friction between contacting members. The welding operations by reason of the electromagnetic action mentioned above, cause the tiny individual strands of wire of which the subconductors are made up to move toward and away from one another, resulting in a pumping action which forces the water into and out from between the strands. In Figs. 1, 2 and 4, the welding cable is shown with the central subconductor of each main conductor encased in a perforated abrasion-resistant jacket or sheath of rubber or equivalent flexible plastic material, Fig. 2 employing an insulating strip separator between the main conductors and Fig. 4 employing a tubular separator. In Figs. 3 and 5, the welding cable is shown with the outer or side subconductors also encased in jackets or sheaths of rubber or equivalent flexible abrasion-resistant material, Fig. 3 employing an insulating strip separator between the main conductors. A sheathing material of nylon or fiber glass, which is foraminous and/or loosely woven so as to have a multiplicity of holes or perforations therethrough may also be satisfactorily used, as shown in Fig. 9, wherein a woven sheathing is employed, designated 26a.

The use of these abrasion-resistant sheaths or jackets around the subconductors places a layer of abrasion-resistant material between the subconductors at the points where they rub, reducing the friction between them, enabling free sliding contact and consequently reducing strand breakage and clogging of the water cooling system, as well as reducing the possibility of short-circuiting of the cable resulting from strands of the subconductors working their way past the edges of the strip separator of Fig. 2 or 3 into contact with one of the subconductors of the opposite main conductor.

Referring to the drawings in detail, Figs. 1 and 2 show a welding cable of this invention, generally designated 10, as consisting of a tubular hose or casing 11 containing an elongated separator 12 disposed loosely therein and extending diametrically across the interior or casing bore 13 and likewise extending substantially from end to end of the casing 11. The casing or hose 11 and the separator 12 are preferably of elastic deformable material such as rubber, synthetic rubber or the like. The separator 12 serves to keep apart and insulate from one another the two main conductors 14 and 15 of the welding cable 10, which are disposed loosely within the casing 11. The main conductor 14 consists of a central subconductor 16 and lateral or side conductors 18 and 20, whereas the opposite main conductor 15 consists of a central subconductor 17 and lateral or side conductors 19 and 21. The lateral subconductors are spaced apart from one another by water-cooling conduits 22 and 24, these preferably being in the form of a bronze spring to enable the cooling water to pass into and out of the conduit between the convolutions thereof while giving the utmost flexibility to the conduit and also straining out splinters of strands of wire which may become broken off from the subconductors during operation.

Each of the subconductors is made up of very small unit conductors 25 which in turn are made up of tiny strands of copper wire wound or twisted together in such units. Many of these units are twisted together to form one of the subconductors 16 to 21 inclusive as shown at the left-hand end of Fig. 1.

In order to reduce friction and abrasion between the subconductors 16, 18 and 20 or 17, 19 and 21, at least one of these subconductors, such as the central subconductor 16 or 17 in Fig. 1 of each main conductor 14 or 15 is loosely encased in a perforated sheath or jacket 26 of abrasion-resistant material, such as rubber. The use of rubber, or in the alternative, plastic in the positions shown in Fig. 2 permits flexion and relative longitudinal sliding between the subconductors 16, 18 and 20 and also between the subconductors 17, 19 and 21 without the excessive friction fraying and breakage of the wire strands which occurs without such protection. The perforations or openings 75 in the sheath or jacket 26 are of a sufficiently large size to provide for the free passage of the cooling water therethrough.

Although three subconductors have been shown as making up each main conductor 14 or 15, it will be understood that a greater or lesser number may also be employed. Three such subconductors have been found a convenient number because the resulting main conductor 14 or 15 thereby possesses a shape of approximately semi-circular cross-section available for each main conductor between the separator 12 and inner wall or bore 13 of the casing 11. The separator 12 is of a form which has been found convenient and efficient in such cables, and has enlarged or thickened longitudinal edges 27 to still further separate the opposing subconductors and thereby still further reduce the possibility of short-circuiting by or between strands which make their way past the edges of the separator 12.

In actual practice, moreover, it has been found convenient to twist the cable winding as a whole, generally designated 30 (Fig. 1), in a longitudinal direction, with one turn or complete revolution being made at suitable intervals, such as approximately every 9 inches in order to impart further flexibility to the cable 10 and likewise to further reduce the "kick" or mutual repulsion between the main cable conductors 14 and 15 when welds are made. The approximately semi-circular cross-sectional shape of each main conductor 14 or 15 with its thin flat separator 12 is of an electrical construction which also greatly reduces such mutual repulsion or kick.

The opposite ends of the winding 30 are connected to so-called cable heads or terminals which form convenient points of connection for the welding transformer and welding gun respectively, together with the cooling water lines used for supplying the cooling water. Such cable heads or terminals form no part of the present invention, but a typical cable head which has enjoyed the most widespread and successful use in the automobile industry and other industries employing spot welding using welding guns is shown in the Wreford United States Patent No. 2,504,777 of April 18, 1950. In such a cable head, the main conductors 14 and 15 are connected to the opposite portions in any suitable way, such as by compressing between socket walls, assisted by silver soldering or other securing operations of a similar character.

In the operation of the welding cable shown in Figs. 1 and 2, let it be assumed for purposes of illustration that the spot welding apparatus is being employed upon a vehicle assembly line, such as in an automobile or railway car body factory. The welding transformer is placed beside the assembly line, and the workman carries the welding gun from one part to another of the body being fabricated, making welds in the different locations necessary. Every time he flexes the cable 10 in carrying the welding gun from one position to another and also every time he makes a weld, the subconductors 16—18—20 and 17—19—21 slide lengthwise relatively to one another as a result of the electromagnetic and mechanical action explained above. The cooling water which meanwhile is flowing through the cooling water conduits 22 and 24 escapes between the spring convolutions forming the conduits into the half chambers 31 and 32 into which the separator 12 divides the bore 13 of the casing 11 and cools the strands of wire of which the subconductors are made up. Since the sheaths 26 of abrasion-resistant material such as rubber or plastic are loosely assembled on the subconductors 16 and 17 and act to maintain the subconductors out of direct contact, the friction and consequent fraying or strand breakage is reduced to a minimum. This minimum is far below the breakage formerly experienced without such a protective jacket or sheath, and results in a greatly increased working life for the cable. Meanwhile, due to the perforated character of the sheaths or jackets 26 and the loose assembly thereof on the subconductors, the cooling water within the half chambers 31 and 32 freely circulates between the strands of the subconductors 16 to 21 inclusive, passing through the perforations 75 in the jackets or sheaths 26 and around the encased subconductors 16 and 17. The perforations 75 are of a sufficiently large size to provide for the cooling of the subconductors 16 and 17 by direct contact thereof with the cooling fluid. However, the perforations 75 are also small enough to prevent direct metal to metal contact of the subconductors 16 and 17 and the subconductors on opposite sides thereof.

The welding cable, generally designated 40, shown in Fig. 3, is similar in general construction to the welding cable shown in Figs. 1 and 2, and similar parts are similarly designated with reference numerals. In the welding cable 40, however, the lateral or side subconductors 18 and 20 of the main conductor 14 and those 19 and 21 of the main conductor 15 are also loosely encased in perforated abrasion-resistant jackets or sheaths 26 of the same construction and having the same properties as the jackets 26 in Fig. 1. The mode of operation of the welding cable 40 of Fig. 3 is substantially the same as that of Fig. 1, with the exception that the abrasion between the subconductors is prevented by the sheathing of all of the subconductors. The same protection results, however, and due to the perforated construction of the jackets 26, the cooling water can also circulate freely.

The welding cable 50 shown in Fig. 4 is generally similar to the welding cable 10 shown in Figs. 1 and 2, the only difference being that the main conductor 14 is enclosed in a tubular separator 51 of elastic deformable material instead of the use of a strip separator 12, as shown in Figs. 1 and 3. The central subconductors 16 and 17 of each main conductor 14 and 15 are encased in the perforated jacket or sheath 26 hitherto described, but direct communication between the interior of the tubular separator 51 and the casing bore 13 is prevented so that cooling water cannot pass between them. Due to the closed construction of the tubular separator 51, moreover, no wandering strands of wire from the subconductors 16, 18 or 20 within the tubular separator 51 can escape from or project from the latter, hence no short-circuiting can occur by contact thereof with strands from the subconductors 17, 19 or 21. Otherwise, the mode of operation of the welding cable 50 of Fig. 4 is substantially the same as that of Fig. 2, and no repetition is therefore necessary.

The welding cable, generally designated 60, shown in Fig. 5 is generally similar to the welding cable shown in Fig. 3, in that all of the subconductors of each main conductor 14 or 15 are encased in the abrasion-resistant jackets or sheaths 26, but, as in Fig. 4, a tubular separator 51 is employed rather than the strip separator 12 of Fig. 3. The advantages of the welding cable 60 and its mode of operation are similar to those of Fig. 1, with the individual advantages of the tubular separator 51 the same as described above in connection with Fig. 4, hence require no repetition.

It is to be understood also that similar results are obtainable by providing sleeves or jackets 26 for only the side subconductors 18, 20, 19 and 21, with the central subconductors 16 and 17 being open. Such a construction is shown in Fig. 6 with a "flat" separator 12, and in Fig. 7 with a tubular separator, 51.

Where all of the subconductors are provided with sleeves 26 formed of an insulating material, the separator may be omitted if desired, and the same is true if the sleeves or sheaths are employed on all but one of the subconductors. Fig. 8 shows such sheaths, 26, on all of the subconductors. In such cases, the sleeves 26 act to effectively prevent contact of subconductors of opposite polarity, the holes or interstices in the sleeves being of course small enough to prevent the strands of wires of opposite polarity from touching, even when they are moved toward each other by the induced magnetic effect. Also, in such cases, a single fluid conduit, as 22a, may be substituted for the pair of conduits 22 and 24 of the previously illustrated embodiments, the conduit preferably being formed of a wire helix with the convolutions spaced from one another, but close enough to perform the filtering action above described.

Although the invention has been described with respect to preferred embodiments thereof, it is to be understood that it is not to be so limited, since changes can be made therein which are within the scope of the invention as defined by the appended claims.

What is claimed is:

1. A flexible liquid-cooled electric welding cable comprising a tubular casing of flexible insulating material having a bore therethrough, an elongated separator of flexible insulating material disposed lengthwise in said bore, said separator extending transversely across said bore and dividing said bore into a plurality of longitudinally-extending liquid-conveying electric conductor compartments separated laterally from one another, a flexible main electrical conductor disposed in each compartment and extending lengthwise of said casing, each main conductor including a plurality of subconductors, each subconductor being composed of a multiplicity of loosely-packed hairlike individual wires, and a liquid-pervious layer of smooth flexible slippery abrasion-resistant material disposed on the exterior of at least one subconductor of each main conductor and effecting flow of cooling liquid thereto from the respective liquid-conveying compartment thereof.

2. A flexible liquid-cooled electric welding cable comprising a tubular casing of flexible insulating material having a bore therethrough, an elongated separator of flexible insulating material disposed lengthwise in said bore, said separator extending transversely across said bore and dividing said bore into a plurality of longitudinally-extending liquid-conveying electric conductor compartments separated laterally from one another, a flexible main electrical conductor disposed in each compartment and extending lengthwise of said casing, each main conductor including a plurality of subconductors, each subconductor being composed of a multiplicity of loosely-packed hairlike individual wires, and a liquid-pervious layer of smooth flexible slippery abrasion-resistant material disposed on the exterior of at least one subconductor of each main conductor and effecting flow of cooling liquid thereto from the respective liquid-conveying compartment thereof, said layer having a multiplicity of holes therethrough for circulation of cooling liquid.

3. A flexible liquid-cooled electric welding cable comprising a tubular casing of flexible insulating material having a bore therethrough, an elongated separator of flexible insulating material disposed lengthwise in said bore, said separator extending transversely across said bore and dividing said bore into a plurality of longitudinally-extending liquid-conveying electric conductor compartments separated laterally from one another, a flexible main electrical conductor disposed in each compartment and extending lengthwise of said casing, each main conductor including a plurality of subconductors, each subconductor being composed of a multiplicity of loosely-packed hairlike individual wires, and a loosely woven liquid-pervious jacket of smooth flexible slippery abrasion-resistant material disposed on the exterior of at least one subconductor of each main conductor and effecting flow of cooling liquid thereto from the respective liquid-conveying compartment thereof.

4. A flexible liquid-cooled electric welding cable comprising a tubular casing of flexible insulating material having a bore therethrough, an elongated separator of flexible insulating material disposed lengthwise in said bore, said separator extending transversely across said bore and dividing said bore into a plurality of longitudinally-extending liquid-conveying electric conductor compartments separated laterally from one another, a flexible main electrical conductor disposed in each compartment and extending lengthwise of said casing, each main conductor including a plurality of subconductors, each subconductor being composed of a multiplicity of loosely-packed hairlike individual wires, and a loosely-woven liquid-pervious jacket of smooth flexible slippery abrasion-resistant material disposed on the exterior of at least one subconductor of each main conductor and effecting flow of cooling liquid thereto from the respective liquid-conveying compartment thereof, said jacket extending substantially the entire length of its respective subconductor.

5. A flexible liquid-cooled electric welding cable comprising a tubular casing of flexible insulating material having a bore therethrough, an elongated separator of flexible insulating material disposed lengthwise in said bore, said separator extending transversely across said bore and dividing said bore into a plurality of longitudinally-extending liquid-conveying electric conductor compartments separated laterally from one another, a flexible main electrical conductor disposed in each compartment and extending lengthwise of said casing, each main conductor including a plurality of subconductors, each subconductor being composed of a multiplicity of loosely-packed hairlike individual wires, and a loosely-woven liquid pervious jacket of smooth flexible slippery abrasion-resistant nylon material disposed on the exterior of at least one subconductor of each main conductor and effecting flow of cooling liquid thereto from the respective liquid-conveying compartment thereof.

6. A flexible liquid-cooled electric welding cable comprising a tubular casing of flexible insulating material having a bore therethrough, an elongated separator of flexible insulating material disposed lengthwise in said bore, said separator extending transversely across said bore and dividing said bore into a plurality of longitudinally-extending liquid-conveying electric conductor compartments separated laterally from one another, a flexible main electrical conductor disposed in each compartment and extending lengthwise of said casing, each main conductor including three subconductors, each subconductor being composed of a multiplicity of loosely-packed hairlike individual wires, and a liquid-pervious layer of smooth flexible slippery abrasion-resistant material disposed on the exterior of at least one subconductor of each main conductor and effecting flow of cooling liquid thereto from the respective liquid-conveying compartment thereof.

7. A flexible liquid-cooled electric welding cable comprising a tubular casing of flexible insulating material having a bore therethrough, an elongated separator of flexible insulating material disposed lengthwise in said bore, said separator extending transversely across said bore and dividing said bore into a plurality of longitudinally-extending liquid-conveying electric conductor compartments separated laterally from one another, a flexible main electrical conductor disposed in each compartment and extending lengthwise of said casing, each main conductor including three subconductors, each subconductor being composed of a multiplicity of loosely-packed hairlike individual wires, and a liquid-pervious layer of smooth flexible slippery abrasion-resistant material disposed on the exterior of the central subconductor of each main conductor and effecting flow of cooling liquid thereto from the respective liquid-conveying compartment thereof.

8. A flexible liquid-cooled electric welding cable comprising a tubular casing of flexible insulating material having a bore therethrough, an elongated separator of flexible insulating material disposed lengthwise in said bore, said separator extending transversely across said bore and dividing said bore into a plurality of longitudinally-extending liquid-conveying electric conductor compartments separated laterally from one another, a flexible main electrical conductor disposed in each compartment and extending lengthwise of said casing, each main conductor including three subconductors, each subconductor being composed of a multiplicity of loosely-packed hairlike individual wires, and a liquid-pervious layer of smooth flexible slippery abrasion-resistant material disposed on the exterior of the outboard pair of subconductors of each main conductor and effecting flow of cooling liquid thereto from the respective liquid-conveying compartment thereof.

9. In a flexible, liquid-cooled electric welding cable including a hollow flexible liquid-tight outer casing and a pair of stranded flexible main conductors therein adapted to conduct current of opposite polarity, each main conductor being formed of a plurality of stranded subconductors, a thin, flexible, liquid-pervious sheathing means individually surrounding and loosely encasing at least a sufficient number of said subconductors to prevent contact between conductors of opposite polarity, said sheathing means being formed of insulating material having low frictional characteristics, said conductors and sheathing means occupying less than the full cross-sectional area of the hollow interior of said casing, whereby liquid may flow longitudinally through the casing, and whereby liquid may flow laterally through the pervious sheathing means and into and out of engagement with the strands of a conductor surrounded thereby, but interengagement and rubbing of the conductors against one another are prevented.

10. In a flexible, liquid-cooled electric welding cable including a hollow flexible liquid-tight outer casing and a plurality of stranded flexible main conductors therein adapted to conduct current of opposite polarity, each main conductor including a plurality of flexible subconductors, and a plurality of thin, flexible, liquid-pervious sheaths formed of insulating material having low frictional characteristics, one such sheath surrounding and loosely encasing each of said subconductors.

11. In a flexible, liquid-cooled electric welding cable including a hollow flexible liquid-tight outer casing and a plurality of stranded flexible main conductors therein adapted to conduct current of opposite polarity, each main conductor including a plurality of flexible subconductors, and a plurality of thin, flexible, liquid-pervious sheaths formed of foraminous plastic insulating material having low frictional characteristics, one such sheath surrounding and loosely encasing each of said subconductors, said conductors and subconductors being isolated from one another only by said sheaths.

12. In a flexible, liquid-cooled electric welding cable including a hollow flexible liquid-tight outer casing and a plurality of stranded flexible main conductors therein adapted to conduct current of opposite polarity, each main conductor including a plurality of a thin, flexible subconductors, and flexible, liquid-pervious sheathing means formed of insulating material having low frictional characteristics and having sheathing portions individually surrounding and loosely encasing each of at least all but one of said subconductors in each main conductor, said conductors and sheathing means occupying less than the full cross-sectional area of the hollow interior of the casing and the sheathing means functioning to prevent rubbing of the subconductors against one another.

References Cited in the file of this patent

UNITED STATES PATENTS

| 306,037 | Turner | Sept. 30, 1884 |
| 1,717,261 | Reeder | June 11, 1929 |
| 2,050,990 | Atkinson | Aug. 11, 1936 |
| 2,315,736 | Rosch | Apr. 6, 1943 |
| 2,691,691 | Wreford | Oct. 12, 1954 |

FOREIGN PATENTS

| 1,126,959 | France | Dec. 5, 1956 |

UNITED STATES PATENT OFFICE
CERTIFICATION OF CORRECTION

Patent No. 2,939,902                          June 7, 1960

John S. Wreford

It is hereby certified that error appears in the above numbered patent requiring correction and that the said Letters Patent should read as corrected below.

Column 8, line 52, strike out "a thin," and insert the same before "flexible", in line 53, same column.

Signed and sealed this 25th day of April 1961.

(SEAL)
Attest:

ERNEST W. SWIDER
Attesting Officer

DAVID L. LADD
Commissioner of Patents